(12) United States Patent
Noehring et al.

(10) Patent No.: US 8,353,003 B2
(45) Date of Patent: Jan. 8, 2013

(54) SYSTEM AND METHOD FOR CONTROLLING A FLOW OF DATA A NETWORK INTERFACE CONTROLLER TO A HOST PROCESSOR

(75) Inventors: Lee Paul Noehring, Glendale, AZ (US); David Allan Schollmeyer, Chandler, AZ (US); Chad William Mercer, Gilbert, AZ (US)

(73) Assignee: Exelis Inc., McLean, VA (US)

( * ) Notice: Subject to any disclaimer, the term of this patent is extended or adjusted under 35 U.S.C. 154(b) by 836 days.

(21) Appl. No.: 11/236,696

(22) Filed: Sep. 27, 2005

(65) Prior Publication Data

US 2006/0075480 A1  Apr. 6, 2006

Related U.S. Application Data

(60) Provisional application No. 60/615,442, filed on Oct. 1, 2004.

(51) Int. Cl.
*H04L 29/00* (2006.01)
(52) U.S. Cl. .............................. 726/2; 726/25
(58) Field of Classification Search ................ 710/29; 370/517; 726/2, 13; 709/233, 250; 713/160
See application file for complete search history.

(56) References Cited

U.S. PATENT DOCUMENTS

| | | | | |
|---|---|---|---|---|
| 5,276,898 A * | 1/1994 | Kiel et al. ..................... | 718/105 |
| 5,751,951 A * | 5/1998 | Osborne et al. ............... | 709/250 |
| 5,875,175 A | 2/1999 | Sherer et al. | |
| 6,452,915 B1 * | 9/2002 | Jorgensen ..................... | 370/338 |
| 6,453,360 B1 | 9/2002 | Muller et al. | |
| 6,570,884 B1 | 5/2003 | Connery et al. | |
| 6,606,301 B1 | 8/2003 | Muller et al. | |
| 6,625,118 B1 | 9/2003 | Hadi Salim et al. | |
| 6,654,373 B1 * | 11/2003 | Lie et al. ....................... | 370/392 |
| 6,697,870 B1 * | 2/2004 | Cafarelli et al. ............... | 709/233 |
| 7,120,171 B2 * | 10/2006 | Sasaki ............................ | 370/517 |
| 7,146,438 B2 * | 12/2006 | Han ............................... | 710/29 |
| 7,219,121 B2 * | 5/2007 | Kaniyar et al. ............... | 709/201 |
| 2001/0055303 A1 | 12/2001 | Horton et al. | |
| 2002/0010800 A1 * | 1/2002 | Riley et al. ................... | 709/249 |
| 2003/0009560 A1 | 1/2003 | Venkitaraman et al. | |
| 2003/0145097 A1 | 7/2003 | Connor et al. | |
| 2003/0200369 A1 | 10/2003 | Musumeci | |
| 2004/0073703 A1 | 4/2004 | Boucher et al. | |
| 2004/0078485 A1 | 4/2004 | Narayanan | |

(Continued)

OTHER PUBLICATIONS

Monitor Synonyms, Monitor Antonyms, Thesaurus.com, pp. 1-5.*

(Continued)

*Primary Examiner* — David Garcia Cervetti
*Assistant Examiner* — Ghazal Shehni
(74) *Attorney, Agent, or Firm* — Davidson Berquist Jackson & Gowdey, LLP

(57) ABSTRACT

A system and method for controlling a flow of data from a network interface controller (NIC) to a host processor coupled to the NIC. Data such as IP packets are received by the NIC and may be transmitted to the host processor for further processing such as firewall processing. The NIC is in communication with the host processor using, for example, a software driver running on the host processor. The NIC may monitor the processing load on the host processor as it handles packet data received from the NIC. As the processing load increases, the NIC may begin to throttle the quantity of packets being sent to the host processor in order to avoid overloading the host processor. The throttling may be governed by a heuristic throttling function.

21 Claims, 3 Drawing Sheets

U.S. PATENT DOCUMENTS

2004/0111535 A1 6/2004 Boucher et al.
2004/0146006 A1* 7/2004 Jackson .................. 370/230

OTHER PUBLICATIONS

Corrent Corporation; Davis, John, Chief Technical Officer; "Using Hardware Accelerated Firewalls to Defeat DDoS Attacks"; Corrent White Paper Series; pp. 1-6; Oct. 2003; United States.

Carnegie Mellon University Software Engineering Institute; CERT Coordination Center; "Denial of Service Attacks"; Oct. 2, 1997; printed from Internet as pp. 1-6; United States.

IEEE Computer Society, IEEE Security & Privacy, Building Confidence in a Networked World; David Moore, et al., "Inside the Slammer Worm"; printed from Internet as pp. 1-11; United States.

* cited by examiner

SYSTEM AND METHOD FOR CONTROLLING A FLOW OF DATA A NETWORK INTERFACE CONTROLLER TO A HOST PROCESSOR

RELATED APPLICATION

This application is a non-provisional application claiming benefit under 35 U.S.C. sec. 119(e) of U.S. Provisional Application Ser. No. 60/615,442, filed Oct. 1, 2004 (titled SYSTEM AND METHOD FOR CONTROLLING A FLOW OF DATA FROM A NETWORK INTERFACE CONTROLLER TO A HOST PROCESSOR by Noehring et al.), which is incorporated in full by reference herein.

BACKGROUND OF THE INVENTION

This invention relates in general to computer systems and networks. More specifically, the present invention relates to a network interface controller (NIC) that receives communication packets from a computer network.

The interface between a computer and a network is often a bottleneck for communications passing between the computer and the network. While computer performance (e.g., processor speed) has increased exponentially over the years and computer network transmission speeds have undergone similar increases, inefficiencies in the way network interface circuits handle communications have become more evident. These inefficiencies involve several basic problems in the way communications between a network and a computer are handled.

Today's most popular forms of networks tend to be packet-based. These types of networks, including the Internet and many local area networks, transmit information in the form of packets. Each packet is typically separately created and transmitted by an originating end station and is separately received and processed by a destination end station. In addition, each packet may be received and processed by numerous stations located between the originating and destination end stations.

One problem concerning the interaction between present NICs and host computer systems is that the rate at which packets are transferred from a network interface circuit to a host computer or other communication device may fail to keep pace with the rate of packet arrival at the network interface. One element or another of the host computer (e.g., a memory bus or processor) may be over-burdened or otherwise unable to accept packets with sufficient speed. In this event one or more packets may be dropped or discarded. Dropping packets may cause a network entity to re-transmit some traffic and, if too many packets are dropped, a network connection may require re-initialization. Further, dropping one packet or type of packet instead of another may make a significant difference in overall network traffic. Unless the dropping of packets is performed in a manner that distributes the effect among many network connections or that makes allowance for certain types of packets, network traffic may be degraded more than necessary.

One type of situation that typically leads to a high rate of packet arrival at the network interface is a so-called denial of service (DOS) attack, which includes attacks known as distributed denial of service (DDOS) attacks. DOS attacks are usually malicious in nature, and firewalls are typically used as a defense against such attacks. Firewalls are designed to allow desired traffic in while keeping undesired traffic out. A challenging problem is how to operationally survive a DOS attack when the undesired traffic is saturating the processing capability and bandwidth of the network. Although undesired packets are excluded during such saturation, desired packets also are often failing to pass through the firewall.

A serious problem created by a DOS attack (and especially a DDOS attack) is the degradation of a firewall's ability to process packet streams. When a typical firewall is inundated with traffic, it can quickly become overwhelmed with the burden of classifying and discarding traffic, regardless of available bandwidth, to the point where valid connection traffic cannot be serviced.

One common form of DOS attack bombards a firewall with so much rejected traffic that the firewall is unable to forward allowed traffic. DOS attacks do not always involve heavy loads, however. DOS typically describes any state in which a firewall is offered rejected traffic that prohibits the firewall from forwarding some or all allowed traffic. In some cases, even a small amount of traffic may significantly degrade firewall performance, or effectively shut down firewall processing altogether. Further, safeguards sometimes used in firewalls to guard against such attacks may have a significant negative impact on performance.

In a typical DDOS attack, an attacker "highjacks" a large number of often widely dispersed computers that have previously been infected by a worm that carries DOS tools as the payload. The DDOS agents or "zombies" are directed to attack a specific IP address. This type of focused network attack is designed to effectively shut down the network device's Internet presence. There are operating system (OS) specific attacks, such as Jolt 2 and others, which target end hosts, but attacks to shut down networks are typically based on packet flooding.

SYN flooding was a formerly popular type of attack, but is rare today because of widely implemented techniques that reduce its effectiveness. More prevalent are UDP or ICMP attacks, like DNS flooding, Trinoo, TFN, and similar variants, as well as worm attacks such as Blaster. When these flood attacks hit, legitimate traffic cannot get into a corporate network from outside. Inability to process the high rate of small packet traffic is normally the reason. In many cases, a network device like a firewall runs out of resources, whether processing power or memory, when inundated with a seemingly endless stream of traffic from a DDOS attack.

Firewalls have a specific role in the protection of the network and allow or deny traffic to pass based on a simple or complex set of rules. Most high performance firewalls today count on normal network traffic behavior in matching the resource capacity to the bandwidth. Normal traffic has a mix of packet sizes and an established flow, which eases the processing burden for a firewall. Packet data on an established flow can be more easily matched, processed, and forwarded than the additional processing required in classifying and creating the flow for an initial packet transiting the firewall. Yet, this is the type of focused demand that a DDOS attack creates on the firewall.

Some DDOS attacks have a defined fingerprint (or a trait such as port spoofing) that can be detected by a firewall to filter the traffic from infiltrating a network. Other DDOS attacks are masked as legitimate traffic which may be allowed through by the firewall rules. In either case, each incoming packet must be processed by the firewall, and during a packet flood, that may be an impossible task if the needed capacity isn't available.

Host processors are typically connected to a network using a NIC and in normal operation regularly receive communication packets from, and send communication packets to, the NIC. When under a DDOS attack, existing host processors often do not have sufficient time to process the packets received from their NICs because they devote most of their time handling the interrupts, buffering packets and discarding those same packets as their input buffers become full. Most existing NICs provide interrupt coalescing to help alleviate this problem, but this typically only helps during the processing of normal traffic. During a DDOS attack, interrupt coalescing provides only limited relief. Existing NICs also provide priority queues so that, during normal traffic conditions, higher priority traffic can be processed while lower priority traffic may be dropped. Priority queues also only provide fairly limited assistance in alleviating the adverse effects of a DDOS attack.

Existing NIC devices typically only discard packets when their internal buffers overflow, which indicates that the host processor processing capability is not able to keep up with the packet arrival rate at the NIC. This usually indicates that the host processor is already fully occupied in attempting to handle the DDOS packets being received from the NIC. In this situation, the host processor is unable to do any significant processing on the actual content of the packets as it is too busy handling interrupts from the NIC, moving packets from one host processor queue to another, and discarding packets as its buffers and queues overflow.

In light of the above, it would be desirable to have a system and method that provides improved handling and processing of packets during a DOS or other type of attack, that provides improved processing of desired new or existing network connections while maintaining network protection from an attack by rejecting or dropping proscribed packet data as it is received, and that provides improved dropping of undesired packet traffic without severely decreasing desired packet traffic.

BRIEF DESCRIPTION OF THE DRAWINGS

The invention is pointed out with particularity in the appended claims. However, for a more complete understanding of the present invention, reference is now made to the following figures, wherein like reference numbers refer to similar items throughout the figures:

Figure 1:
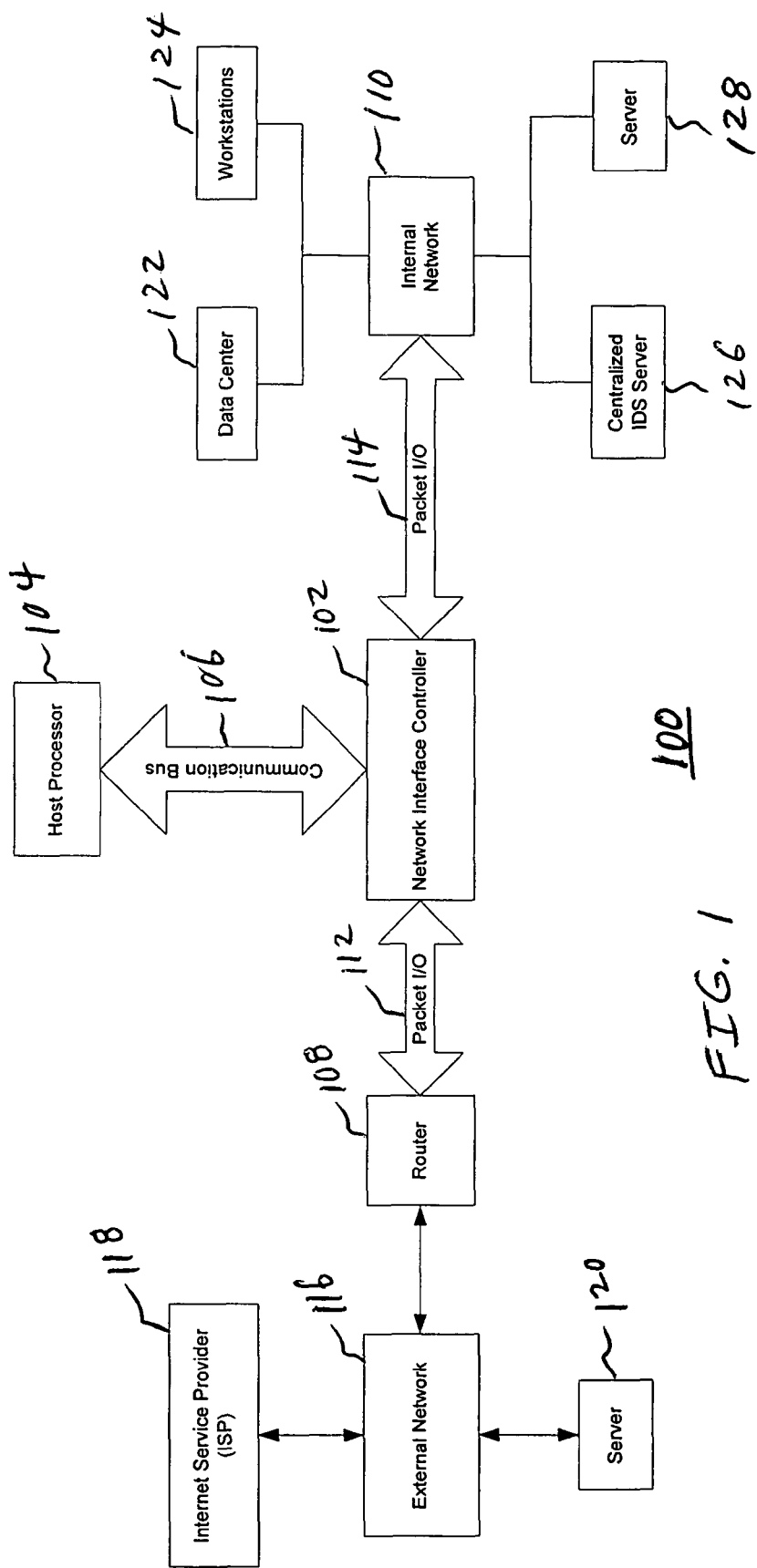
FIG. 1 is a schematic diagram illustrating a computer communications system including a network interface controller (NIC) in communication with a host processor in accordance with an embodiment of the present invention.

The exemplification set out herein illustrates an embodiment of the invention in one form, and such exemplification is not intended to be construed as limiting in any manner.

DETAILED DESCRIPTION OF THE DRAWINGS

The following description and the drawings illustrate specific embodiments of the invention sufficiently to enable those skilled in the art to practice it. Other embodiments may incorporate structural, logical, process and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The elements that implement the various embodiments of the present invention are described below, in some cases at an architectural level. Many elements may be configured using well-known structures. The functionality and processes herein are described in such a manner to enable one of ordinary skill in the art to implement the functionality and processes within the architecture.

The processing described below may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any type of memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including existing memory technologies as well as hardware or circuit representations of such structures and of such data.

It should also be understood that the techniques of the present invention might be implemented using a variety of technologies. For example, the methods described herein may be implemented in software running on a programmable microprocessor, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or other computer-readable medium.

As used herein, the term "network interface controller" or "NIC" should be interpreted to broadly include communication devices that provide an interface to a network including, but not limited to, network interface circuits, PCI cards, modems, switches, routers, or other communication ports or devices (e.g., serial, parallel, USB, or SCSI). In addition, selected embodiments of the present invention are described below in the form of a network interface controller (NIC) receiving communication packets formatted in accordance with certain communication protocols compatible with the Internet. One skilled in the art will recognize, however, that the present invention is not limited to communication protocols compatible with the Internet and may be readily adapted for use with other protocols.

As used herein, the term "host processor" includes, but is not limited to, host computer systems and other systems and devices with a network protocol stack and/or that execute one or more network applications.

The present invention provides a system and method for controlling a flow of data from a network interface controller (NIC) to a host processor coupled to the NIC by, for example, a communication bus. Data such as, for example, IP packets are generally received by the NIC during operation. During normal operation, some or all of the packets will be transmitted to the host processor for further processing such as, for example, firewall processing. The NIC is in communication with the host processor using, for example, a software driver running on the host processor. The NIC may monitor the processing load on the host processor as it handles packet data received from the NIC. As the processing load increases, the NIC may begin to throttle the quantity of packets being sent to the host processor in order to avoid overloading the host processor's processing capabilities. This manner of throttling may be governed by a throttling function stored, for example, in a memory of the NIC.

FIG. 1 illustrates a computer communications system 100 including a network interface controller (NIC) in communication with a host processor in accordance with an embodiment of the present invention. The NIC may be configured to receive and process communication packets exchanged between a host computer system and a network such as, for example, the Internet. More specifically, a NIC 102 may be coupled to a host processor 104 by a communication bus 106 (e.g., a PCI bus). Internal network 110 may be coupled to NIC 102 by packet I/O interface 114. External network 116 may be coupled to NIC 102 via intermediary router 108, which may be coupled to NIC 102 by packet I/O interface 112. By way of example, an Internet Service Provider (ISP) 118 and server 120 may be connected to external network 116. Internal network 110 may be connected to a data center 122, workstations 124, a centralized Intrusion Detection System (IDS) server 126, and a server 128. Centralized IDS server 126 may be used to collect DOS attack statistics or other information that may be transmitted to server 126 by NIC 102. Server 126 may also collect certain packets transmitted by NIC 102 to server 126, instead of simply dropping such packets at NIC 102, when packet flow to host processor 104 is being throttled as described herein. Such packets may be selected for sending to server 126 based on one or more characteristics associated with the packets (e.g., a packet's five tuple). NIC 102 may in general be located at varying network locations including, for example, network endpoints and as well at desktops and servers throughout the network. At low traffic levels, NIC 102 typically sends all or substantially all of its new inbound packet traffic to host processor 104.

NIC 102 may be configured to receive and manipulate packets formatted, for example, in accordance with a communication protocol or protocol stack (e.g., a combination of communication protocols) supported by one or more networks coupled to NIC 102. A protocol stack may be described with reference to the seven-layer ISO-OSI (International Standards Organization—Open Systems Interconnection) model framework. Thus, one illustrative protocol stack includes the Transport Control Protocol (TCP) at layer four, Internet Protocol (IP) at layer three and Ethernet at layer two.

Other embodiments of the present invention may be configured to work with communications adhering to other protocols, both known (e.g., AppleTalk, IPX (Internetwork Packet Exchange), etc.) and unknown at the present time. One skilled in the art will recognize that the system and methods described herein may be readily adapted for new communication protocols.

Figure 2:
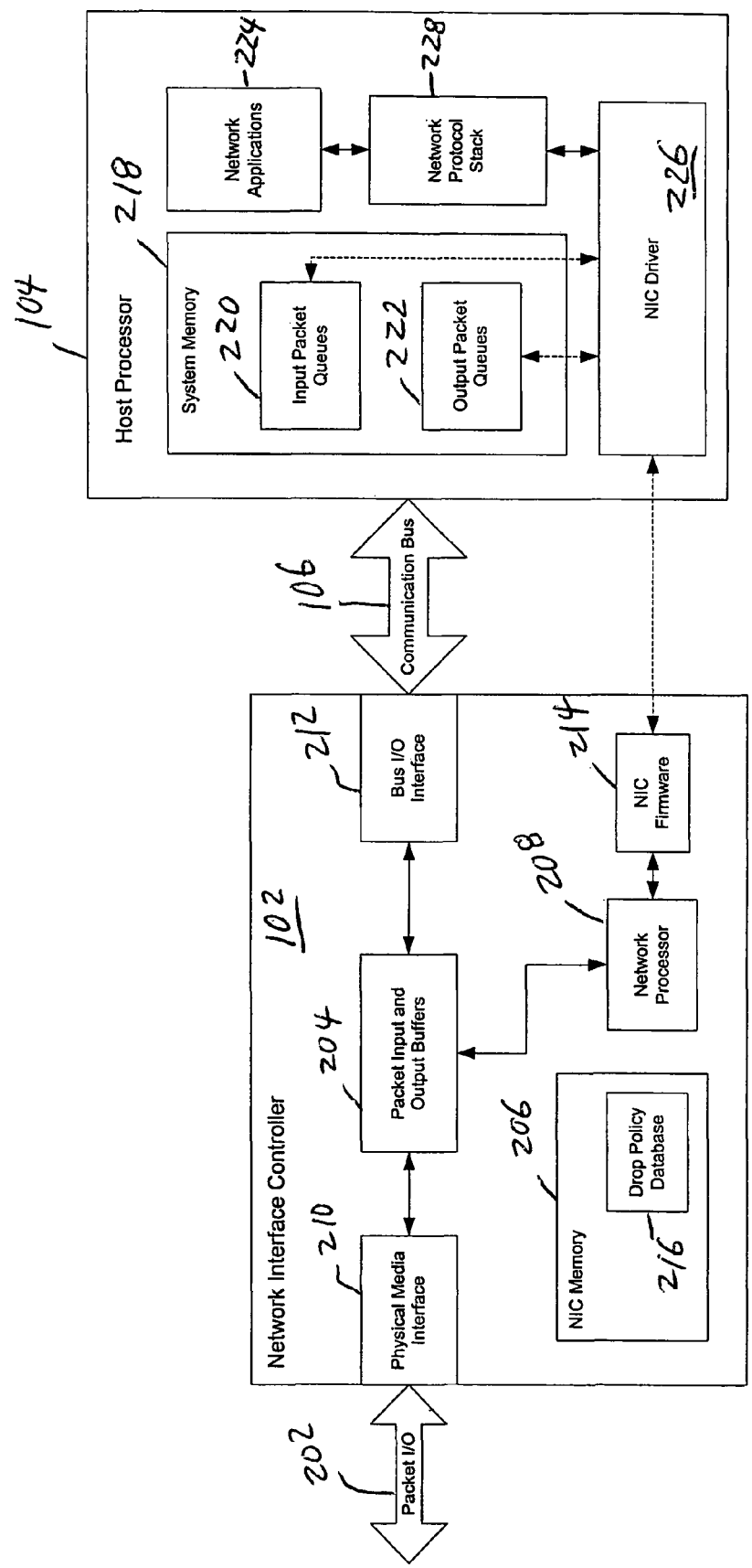
FIG. 2 is a block diagram illustrating in greater detail, in accordance with an embodiment of the present invention, the NIC and host processor of FIG. 1.

FIG. 2 is a block diagram illustrating NIC 102 and host processor 104 in greater detail. Packet I/O interface 202 is representative, and NIC may in practice contain one or more packet I/O interfaces (such as, for example, interfaces 112 and 114 of FIG. 1). NIC 102 may include packet input and output buffers 204, NIC memory 206, and network processor 208. Physical media interface 210 may couple buffers 204 to packet I/O interface 202, and bus I/O interface 212 may couple buffers 204 to communication bus 106. NIC firmware 214 may be executed on network processor 208 to control the operations of NIC 102. Network processor 208 may include firewall and VPN processing capabilities (e.g., the handling of some or all processing for firewall connections and/or security processing to handle some or all IPSec encryption for a VPN). However, in other embodiments, processor 208 may simply be a control processor limited to transferring packets between the network and host processor 104, in which case firewall, VPN and/or other data plane processing functions are handled by host processor 104. Host processor 104 typically may perform one or more of the following functions with respect to packets it receives: network protocol and network application processing (including firewall processing and security processing), interrupt management, dropping of packets, management of packets in an incoming queue, and management of packets in an outgoing queue.

It should be noted that in alternative embodiments, NIC firmware 214 could be implemented as a state machine or other form. However, the use of firmware may permit easier updating in order to, for example, change the priority of certain types of traffic. For example, if a lot of http worms are being received by NIC 102, then port 80 could be assigned a lower priority for handling by NIC 102.

NIC memory 206 may include drop policy database 216, which may be periodically updated by host processor 104, by centralized IDS server 126, and/or by a system administrator through, for example, a graphical user interface (GUI) provided on a device such as, for example, server 128. The drop policy stored in database 216 may be loaded prior to a DOS attack with a policy of undesired (e.g., unwanted or unnecessary) traffic types (e.g., source and destination IP addresses, protocols, source and destination ports, interface numbers, QoS, and/or other additional parameters). Undesired traffic identified by the drop policy may be withheld from host processor 104.

The drop policy may be updated dynamically during and/or after a DOS attack, for example, after a systems administrator identifies the traffic types of the DOS attack. Unwanted traffic that is not identified by the drop policy may be managed by the throttling feature of the present invention described below, which may assist in preventing host processor 104 from being overwhelmed during the attack. In an alternative embodiment, drop policy database 216 may also be stored in full or in part on host processor 104 and/or other devices on a network coupled to NIC 102.

Host processor 104 may include input packet queues 220 and output packet queues 222, which may be stored in a system memory 218. Input packet queues 220 may receive packets sent from packet output buffers 204, and output packet queues 222 may be used to store packets to be sent to packet input buffers 204.

Host processor 104 also may execute a network protocol stack 228 in communication with a NIC driver 226 running on host processor 104. One or more network applications 224 may run on host processor 104 and communicate with network protocol stack 228. The control of certain functions of NIC 102 and host processor 104 may coordinated by communication between NIC firmware 214 and NIC driver 226. Examples of network applications 224 may include, for example, a firewall control processing application or a TCP/IP protocol stack.

As mentioned earlier, NIC 102 may monitor the performance load on host processor 104. This may be accomplished in one way by NIC driver 226 monitoring the lengths of input and output packet queues 220 and 222 during operation and then sending information to NIC firmware 214 related to these lengths. By monitoring these queue lengths, the extent of traffic congestion levels in host processor 104 may be assessed. Typically, only lengths of one or more input packet queues 220 will be monitored. As the length of a queue increases, the queue more closely approaches an overflow condition in which the queue is unable to accept additional packets.

The lengths of input and output packet queues 220 and 222 may be monitored in many of several programmed combinations of data. For example, only the length of a selected single input queue of input packet queues 220 may be monitored. NIC driver 226 may be programmed to determine the manner in which queue length information is processed and sent to NIC 102. In other embodiments, other operating characteristics of host processor 104 such as CPU utilization, etc., may be reported to NIC 102 in a similar manner.

During operation, NIC 102 may use interrupt coalescing and priority queuing (it should be noted that the present invention does not require that these functions be used). According to the present invention, which may optionally be used in addition to interrupt coalescing and/or priority queuing, communication may be provided from NIC driver 226 to NIC firmware 214 to throttle the amount of traffic sent to host processor 104 when it is becoming overwhelmed during a DOS attack or otherwise. NIC driver 226 may use heuristics on input packet queue length to notify NIC 102 of the number of packets that host processor 104 is expected to be able to handle for the next given time period (e.g., every millisecond). As the input queue length or lengths increase on host processor 104, NIC driver 226 may signal NIC firmware 214 to send fewer packets per time period.

When beginning to throttle traffic to host processor 104, NIC 102 may begin to drop packets from packet input and output buffers 204. This typically provides host processor 104 a better opportunity to process the packets it receives rather than to use a large proportion of its processing cycles in discarding packets as input packet queues 220 overflow. When NIC driver 226 detects that queue lengths are decreasing, it may signal NIC 102 to send a greater number of packets per time period.

Figure 3:
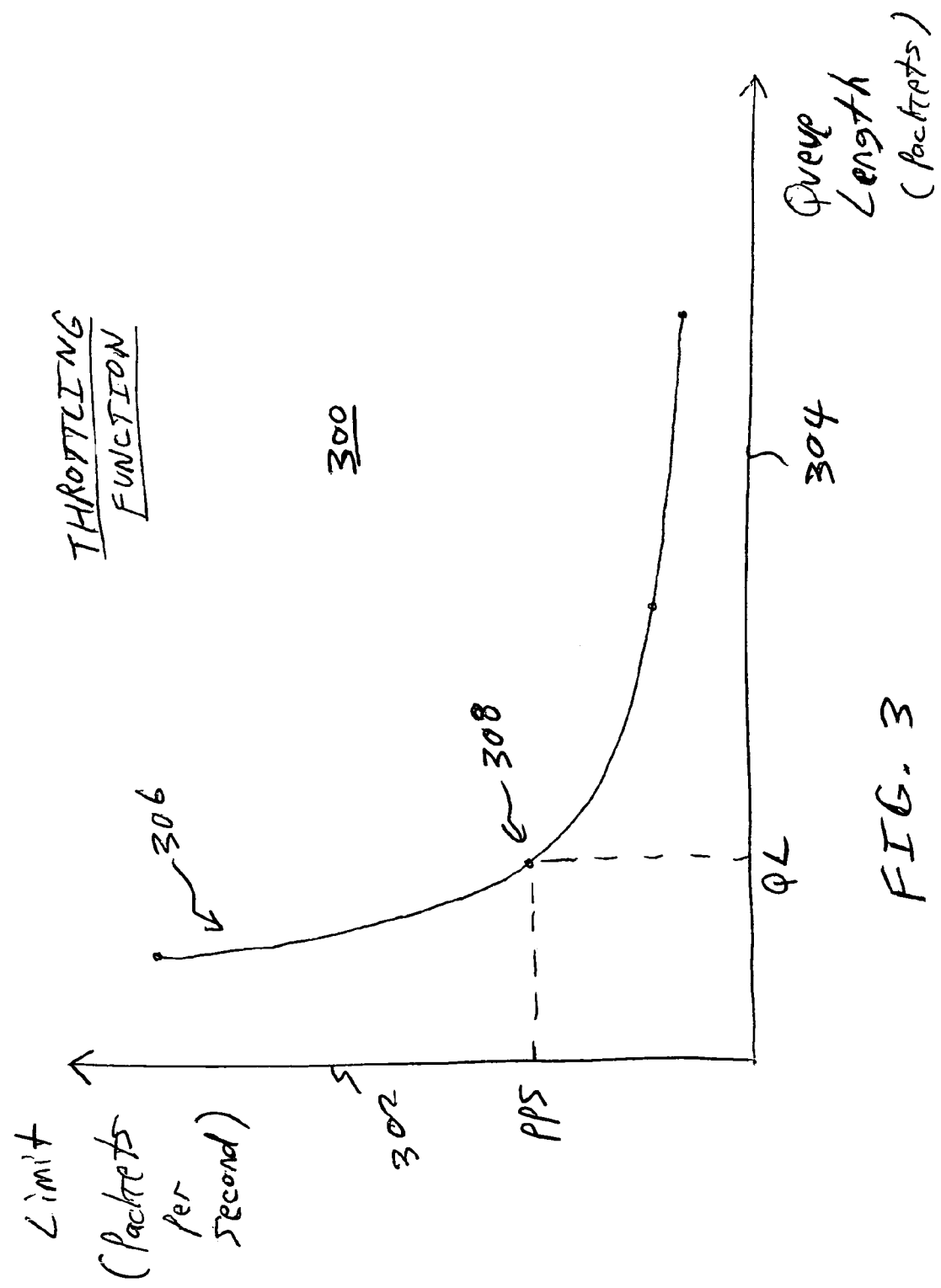
FIG. 3 is a graph illustrating a specific example of a throttling function in accordance with an embodiment of the present invention.

FIG. 3 is a graph 300 illustrating a specific example of a throttling function 306. When NIC 102 throttles traffic flow to host processor 104, the extent of throttling may be determined by throttling function 306. When throttling occurs, NIC firmware 214 may instruct NIC 102 to drop inbound packets that exceed a throttling limit. The throttling limit may be provided as an output of throttling function 306. In graph 300, axis 304 indicates queue length (e.g., a number of packets) as an input, and axis 302 indicates the output as a throttling limit (e.g., number of packets per second or millisecond). For example, for point 308, for an input of QL, NIC 102 will limit traffic flow to host processor 104 at no more than PPS packets per second. Throttling function 306 may be stored, for example, as a table of discrete throttle limit steps in system memory 218 of host processor 104 or alternatively in NIC memory 206. Alternatively, throttling function 306 may provide as an output a limited percentage of all incoming packets that will be sent on to host processor 104 (e.g., a throttle limit of only 70% of incoming packets being sent to host processor 104 over the next millisecond time interval).

Throttling function 306 may be updated during operation by reprogramming NIC 102 using, for example, host processor 104 or another device in communication with NIC 102 such as, for example, centralized IDS server 126. Throttling function 306 may be based on historical performance operating characteristics of host processor 104 or other heuristics. NIC firmware 214 may optionally be programmed to implement other types of, and/or more complex, throttling functions.

Depending on the traffic congestion level in host processor 104, NIC driver 226 may instruct NIC 102 to throttle as determined by function 306. When traffic congestion (e.g., as determined by queue lengths) falls below a certain level, NIC firmware 214 may instruct NIC 102 to disable throttling. The communication by NIC driver 226 to NIC firmware 214 regarding queue lengths may be updated on a real-time basis (e.g., updated every millisecond or other time period as appropriate for the response times of host processor 104 and NIC 102). For example, this updating may be done every time an interrupt is sent to NIC firmware 214.

The throttling by NIC 102 may be made even more intelligent by selecting certain types of traffic to be given higher priority. More specifically, different throttling limits may be provided depending on the priority assigned to a particular type of packet traffic. For example, NIC firmware 214 may give a higher priority to TCP SYN packet types over UDP packet types if UDP packets have been used in most prior DDOS attacks. So, when throttling occurs, only packets of a certain type (e.g., UDP) may be throttled initially, to be optionally followed by throttling of other types of packets at even higher traffic congestion levels.

In other embodiments, NIC 102 may also store two or more throttling limits with each throttling limit being applied to a type of traffic identified, for example, by packet type or other information as discussed herein. Each throttling limit may correspond to a different throttling function, or each throttling limit may be derived from a common throttling function. The selection of different throttling limits or throttling prioritization of packet data or packet traffic as described in the foregoing paragraphs may be based on one or more of many types of packet data information fields such as, for example, IP addresses, TCP or UDP port, protocol, TCP flag, IP TOS value, VLAN (Virtual Local Area Network) ID, or QoS (Quality of Service) flag.

In an embodiment in which network processor 208 is able to perform all data plane processing for previous connections (e.g., firewall and VPN processing), such data plane processing may be used to continue passing packets for established connections through NIC 102 while simultaneously throttling a portion of new traffic for processing by host processor 104. This may permit the addition of new connections even if NIC 102 is also receiving large numbers of packets in a DDOS attack.

By the foregoing description, an improved system and method for controlling a flow of data from an NIC to a host processor have been described. The present invention may provide improved handling and processing of packets during a DOS or other type of attack, improved processing of desired new or existing network connections while maintaining network protection from an attack, and improved dropping of undesired packet traffic without severely decreasing desired packet traffic.

The foregoing description of specific embodiments reveals the general nature of the invention sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed:

1. A method for controlling a flow of data from a network interface controller (NIC) to a host processor, the method comprising:
    receiving data on the NIC;
    sending at least a portion of the data received by the NIC to the host processor coupled to the NIC;
    monitoring a load on the host processor as the host processor handles the data received from the NIC; and throttling the sending of the data from the NIC to the host processor in response to the monitoring of the load.

2. The method of claim 1 wherein the extent of throttling of the sending of the data is determined using a throttling function.

3. The method of claim 2 wherein the throttling function provides a packet output rate, for sending packets from the NIC to the host processor, based on an input queue length of the host processor.

4. The method of claim 1 wherein the NIC comprises a network processor; and the method further comprising processing at least a portion of data received by the NIC using the network processor wherein the portion of data processed by the network processor is sent from the NIC to another network device without prior processing by the host processor.

5. The method of claim 1 wherein the NIC comprises a buffer for receiving data and the throttling of the sending of the data comprises removing data from the buffer.

6. The method of claim 5 the throttling comprises selectively removing data from the buffer based on packet type.

7. The method of claim 1 wherein the throttling of the sending of the data comprises:
selecting a throttling limit; and
limiting the flow of data from the NIC to the host processor to a quantity no greater than the throttling limit.

8. The method of claim 7 wherein:
the host processor comprises one or more input packet queues for receiving data from the NIC;
and the throttling limit is selected using a throttling function that relates an expected processing capability of the host processor to one or more of the input queue lengths of the one or more input packet queues.

9. The method of claim 1 further comprising accessing a drop policy database to obtain information regarding a selection of packets to be removed from the NIC without being sent to the host processor.

10. The method of claim 9 wherein the drop policy database comprises information regarding types of undesired traffic.

11. The method of claim 9 further comprising dynamically updating the drop policy database in response to a denial of service attack.

12. The method of claim 11 wherein the updating comprises:
identifying new traffic types included as part of the denial of service attack that were not previously stored in the drop policy database; and
adding information regarding the new traffic types to the drop policy database.

13. The method of claim 12 wherein the throttling of the sending of the data is applied only with respect to data received by the NIC that does not correspond to a traffic type stored in the drop policy database.

14. A method for controlling a flow of packets from a network interface controller (NIC) to a host processor, the method comprising:
monitoring a packet processing load on the host processor coupled to the NIC as the host processor handles packets received from the NIC; and
throttling the sending of the packets from the NIC to the host processor in response to the monitoring of the load.

15. The method of claim 14 wherein the throttling of the sending of the packets comprises limiting the number of packets flowing from the NIC to the host processor over a time period.

16. The method of claim 15 wherein the throttling of the sending of the packets further comprises using a throttling function to determine the number of packets that are permitted to flow from the NIC to the host processor.

17. A method for controlling a flow of packets from a network interface controller (NIC) to a host processor, the method comprising:
monitoring by the NIC of one or more input packet queue lengths of the host processor;
using a throttling function to select a throttling limit dependent on the one or more input packet queue lengths monitored by the NIC; and
limiting the flow to the host processor of packets received by the NIC that exceed the throttling limit.

18. The method of claim 17 wherein the throttling limit is a number of packets per time period.

19. The method of claim 17 further comprising disabling the limiting of the flow to the host processor in response to the one or more input packet queue lengths falling below a predetermined limit.

20. The method of claim 17 wherein the throttling function relates an expected packet processing capability of the host processor to the one or more of the input packet queue lengths.

21. A method for controlling a flow of data from a network interface controller (NIC) to a host processor, the method comprising:
receiving data on the NIC;
sending at least a portion of the data received by the NIC to the host processor;
assigning a priority to a selected portion of the data received by the NIC based on the packet type of the data to provide prioritized data;
monitoring a load on the host processor as the host processor handles the data received from the NIC; and
throttling the sending of the prioritized data from the NIC to the host processor in response to the monitoring of the load.

* * * * *